(12) United States Patent
Fukutoku (10) Patent No.: US 7,408,541 B2
(45) Date of Patent: Aug. 5, 2008

(54) LIQUID CRYSTAL DISPLAY DEVICE

(75) Inventor: Syouichi Fukutoku, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 512 days.

(21) Appl. No.: 10/808,071

(22) Filed: Mar. 24, 2004

(65) Prior Publication Data

US 2004/0189629 A1 Sep. 30, 2004

(30) Foreign Application Priority Data

Mar. 31, 2003 (JP) ............................. 2003-095287

(51) Int. Cl.
*G06F 1/38* (2006.01)
(52) U.S. Cl. ...................................... 345/211; 349/114
(58) Field of Classification Search .................... 345/96, 345/98, 92, 204, 95, 87, 211, 89; 349/114; 330/257

See application file for complete search history.

(56) References Cited

U.S. PATENT DOCUMENTS

| | | | | |
|---|---|---|---|---|
| 4,779,956 A | * | 10/1988 | Nemoto et al. | 345/96 |
| 5,248,963 A | * | 9/1993 | Yasui et al. | 345/98 |
| 6,064,360 A | * | 5/2000 | Sakaedani et al. | 345/92 |
| 6,151,016 A | * | 11/2000 | Kanbe et al. | 345/204 |
| 6,323,851 B1 | * | 11/2001 | Nakanishi | 345/211 |
| 6,359,607 B1 | | 3/2002 | Yanagi et al. | |
| 6,690,345 B2 | * | 2/2004 | Hanzawa et al. | 345/95 |
| 6,756,958 B2 | * | 6/2004 | Furuhashi et al. | 345/95 |
| 6,909,414 B2 | * | 6/2005 | Tsuchi et al. | 345/89 |
| 6,961,034 B2 | * | 11/2005 | Kusanagi | 345/87 |
| 6,977,549 B2 | * | 12/2005 | Tsuchi | 330/257 |
| 7,023,511 B1 | * | 4/2006 | Lee | 349/114 |
| 7,027,017 B2 | * | 4/2006 | Yer | 345/87 |
| 7,109,965 B1 | * | 9/2006 | Lee et al. | 345/98 |
| 2001/0009411 A1 | | 7/2001 | Kusanagi | |
| 2002/0060673 A1 | | 5/2002 | Noritake et al. | |

FOREIGN PATENT DOCUMENTS

| | | |
|---|---|---|
| JP | 1-170986 | 7/1989 |
| JP | 10-214062 | 8/1998 |
| JP | 10-214097 | 8/1998 |
| JP | 2001-125060 | 5/2001 |
| JP | 2001-125096 | 5/2001 |
| JP | 2001-195025 | 7/2001 |
| JP | 2001-209355 | 8/2001 |
| JP | 2002-175062 | 7/2002 |

* cited by examiner

*Primary Examiner*—Amare Mengistu
*Assistant Examiner*—Yuk Chow
(74) *Attorney, Agent, or Firm*—Greer, Burns & Crain, Ltd.

(57) ABSTRACT

When an input power supply fed to a liquid crystal display device is cut off, a gate-on power supply for driving a gate line of a display part is automatically changed from a first power supply that reduces luminance inclination unevenness in the display part to a second power supply that causes residual charges in liquid crystal to be discharged. Consequently, at a normal driving time, a good quality display image with reduced unevenness in luminance inclination can be obtained, and at a power-off time, the display due to the residual charges of the liquid crystal is cleared so that an after image can be prevented from being visible.

26 Claims, 5 Drawing Sheets

LIQUID CRYSTAL DISPLAY DEVICE

CROSS-REFERENCE TO RELATED APPLICATIONS

This application is based upon and claims the benefit of priority from the prior Japanese Patent Application No. 2003-095287, filed on Mar. 31, 2003, the entire contents of which are incorporated herein by reference.

BACKGROUND OF THE INVENTION

1. Field of the Invention

The present invention relates to a liquid crystal display device, and more particularly, to changeover control of a driving power supply in the liquid crystal display device.

2. Description of the Related Art

In recent years, liquid crystal display devices are in wide use in devices for mobile use such as portable devices. In accordance therewith, a demand for low power consumption liquid crystal display devices suitable for outdoor use is increasing and reflective liquid crystal display devices are drawing attention.

The reflective liquid crystal display device is suitable for reducing power consumption and for outdoor use since it constantly utilizes external light as a light source without using any backlight. However, since the reflective liquid crystal display device uses external light as a light source, especially in a liquid crystal display device of an active matrix type, an afterimage remains visible by a user due to residual charges in liquid crystal whenever the power supply is cut off (power-off), which results in deteriorated display quality.

A method of quickly clearing the display at the power-off time in the conventional reflective liquid display device is disclosed in the patent document 1 (Japanese Patent Application Laid-open No. Hei 1-170986). A reflective liquid crystal display device disclosed in the patent document 1 is configured such that a driving power supply is directly fed from a power source of the display device to a source driving circuit for driving source lines (source signal lines) of a display part, and a driving power supply is fed to a gate driving circuit for driving gate lines (gate signal lines) from the power source via a power holding circuit having a capacity large enough to hold a power for a prescribed time.

Then, a power-off signal generated based on the detection of a power-off state is inputted to a gate driving circuit, so that the gate lines connected to the gate driving circuit are all activated (activated to turn on transistors connected to the gate lines) simultaneously using the power held in the power holding circuit. Consequently, residual charges in liquid crystal at the power-off time are discharged in a short time to clear the display, so that an afterimage is prevented from being visible.

Further, another example of the conventional art is disclosed in, for example, the patent document 2 (Japanese Patent Application Laid-open No. 2001-195025).

Figure 5:
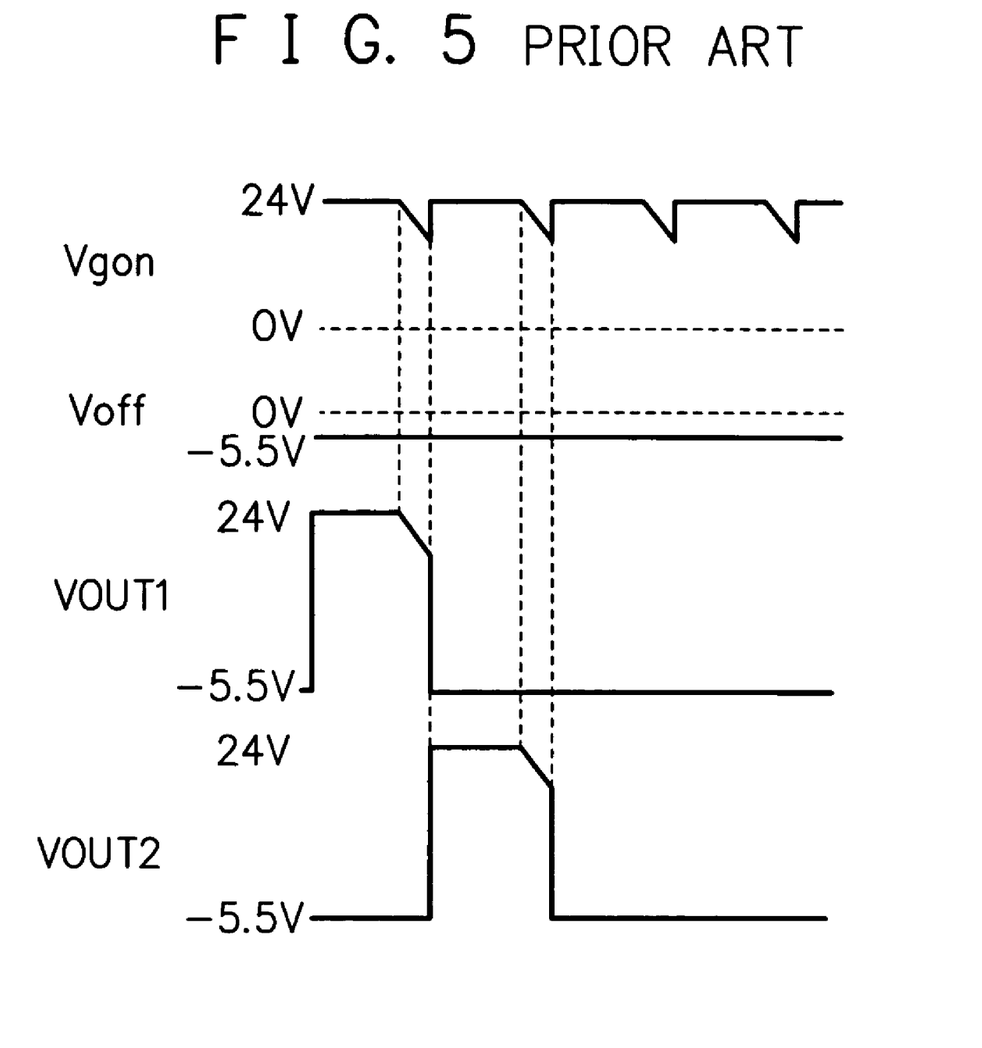
FIG. 5 is a chart showing an example of conventional gate driving waveforms.

However, if a driving waveform of gate lines at a normal driving time is a rectangular wave as in the conventional reflective liquid crystal display device described above, unevenness in luminance inclination may possibly occur in a display part between pixels closer to the gate driving circuit and pixels distant therefrom. Methods of solving this unevenness in luminance inclination include a method in which a voltage of a driving power supply (hereinafter, referred to as a "gate-on power supply") Vgon for activating gate lines is varied with time (in a pulsed manner) to be fed to the gate driving circuit, thereby blunting gate driving waveforms VOUT1, VOUT2, . . . as shown in FIG. 5 (see, for example, the patent document 3 (Japanese Patent Application Laid-open No. 2001-125069)).

The use of such gate driving waveforms VOUT1, VOUT2 . . . whose falling edges are blunted can reduce luminance unevenness in the direction in which the gate lines extend. Note that Voff is a driving power supply for inactivating the gate lines (hereinafter, referred to as a "gate-off power supply") in FIG. 5. Further, a circuit for generating the gate-on power supply Vgon as shown in FIG. 5 will be referred to as a luminance inclination circuit.

However, the method of reducing luminance inclination unevenness using the luminance inclination circuit has a problem that the power holding circuit that causes residual charges in liquid crystal to be quickly discharged to clear the display at the power-off time as described above is not applicable to the gate driving circuit. In other words, though display quality at a normal driving time is improved, display quality deterioration due to the afterimage at the power-off time cannot be avoided. This is because in the method of reducing luminance inclination unevenness, the voltage of the gate-on power supply Vgon is varied with time at the normal driving time, and if the power holding circuit is used, voltage fluctuation is made small due to its large capacity or the like, which makes it difficult to cause voltage variation (makes it difficult to generate a blunted waveform).

SUMMARY OF THE INVENTION

An object of the present invention is to realize improved display quality in a liquid crystal display device not only at a normal driving time but also at a power-off time.

A liquid crystal display device of the present invention is characterized in that at least one internal power supply is automatically changed from a first power supply to a second power supply when an input power supply fed to the liquid crystal display device is cut off.

According to the present invention, the automatic changeover of the internal power supply is made possible in such a manner that the first power supply shown by the power supply Vgon in FIG. 5 is used as the internal power supply when the input power supply is fed, and the second power supply by a held power is used as the internal power supply when the input power supply is cut off. Consequently, a good quality display image with reduced unevenness in luminance inclination can be displayed at the normal driving time during which the input power supply is fed. In addition, when the input power supply is cut off, residual charges in liquid crystal are discharged in a short time, so that an afterimage can be prevented from persisting.

DETAILED DESCRIPTION OF THE PREFERRED EMBODIMENTS

Hereinafter, an embodiment of the present invention will be explained based on the drawings.

Figure 1:
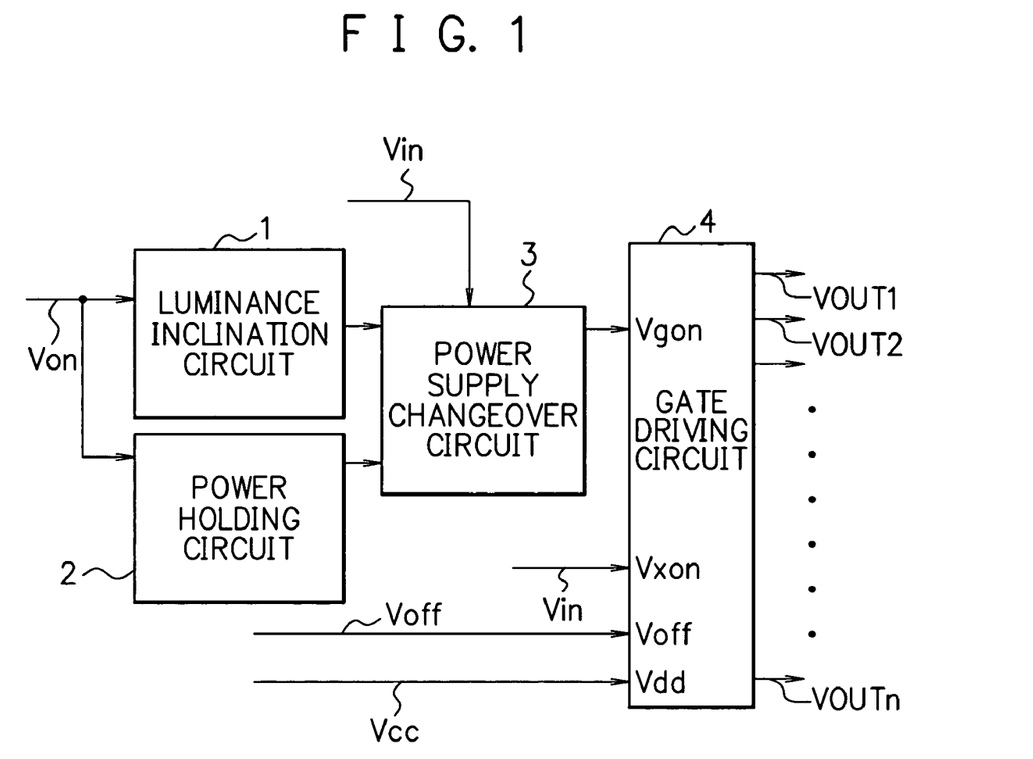
FIG. 1 is a block diagram showing characteristic elements of a liquid crystal display device according to an embodiment.

FIG. 1 is a block diagram showing characteristic elements of a liquid crystal display device according to an embodiment of the present invention. It should be noted that the liquid crystal display device to be explained below is not limited to a specific type, but it is suitable for use as a liquid crystal display device which sometimes utilizes external light as a light source, for example, a reflective liquid crystal display device and a transflective liquid crystal display device (a liquid crystal display device that can be a reflection type and a transmission type according to outside brightness, control, and so on).

In FIG. 1, a first power supply, such as a luminance inclination circuit 1, changes a voltage of a gate-on power supply Von for activating gate lines, in synchronization with an output of a gate driving circuit 4, and outputs a gate-on power supply for gate driving circuit as shown by the power supply Vgon in FIG. 5. The use of this gate-on power supply for gate driving circuit makes it possible to intentionally blunt falling edges of outputs (gate driving voltages) VOUTi (i is a suffix and a natural number: i=1 to n) of the gate driving circuit 4. This can reduce luminance unevenness in a direction in which the gate lines extend.

A second power supply, such as a power holding circuit 2, holds a power fed by the gate-on power supply Von for a predetermined period of time and it is constituted using capacitors or the like having a sufficiently large capacity.

A power supply changeover circuit 3 selectively outputs one of an output voltage of the luminance inclination circuit 1 and an output voltage of the power holding circuit 2 to the gate driving circuit 4 according to the voltage level of an input power supply (device power supply) Vin fed from a not-shown power supply device or the like. Specifically, when a voltage value of the device power supply Vin is higher than a predetermined voltage value, the power supply changeover circuit 3 outputs the output voltage of the luminance inclination circuit 1 to the gate driving circuit 4, while, when the voltage value of the device power Vin is equal to or lower than the predetermined voltage value, it outputs the output voltage of the power holding circuit 2 to the gate driving circuit 4.

The gate driving circuit 4 has a gate-on power supply terminal Vgon, an all-output-on terminal Vxon, a gate-off power supply terminal Voff, and a power supply terminal Vdd for driving each logic, and these terminals are supplied with the output voltage of the power supply changeover circuit 3, the device power supply Vin, a gate-off power supply Voff, and a logic power supply Vcc respectively.

When the device power supply Vin fed to the all-output-on terminal Vxon is high level, the gate driving circuit 4 outputs pulse signals in sequence every one gate line period from outputs VOUT1 to VOUTn based on not-shown inputted control signals such as a gate start pulse and a gate shift clock. Therefore, the gate driving circuit 4 (shifts and) drives the plural gate lines provided in a later-described display part in sequence starting from an upper area of a screen. By this operation, transistors (TFTs; thin film transistors) connected to the selected gate lines are turned on, and display data (tone voltages) are written to respective pixels associated with the selected gate lines. Note that the pulse signals are generated by synthesizing the output of the luminance inclination circuit 1 and the gate-off power supply Voff.

On the other hand, when the devise power supply Vin fed to the all-output-on terminal Vxon turns to low level, the gate driving circuit 4 asynchronously outputs a voltage, which is supplied to the gate-on power supply terminal Vgon, to all the outputs VOUT1, VOUT2, . . . , VOUTn of the gate driving circuit 4 irrespective of other input signals.

Figure 2A:
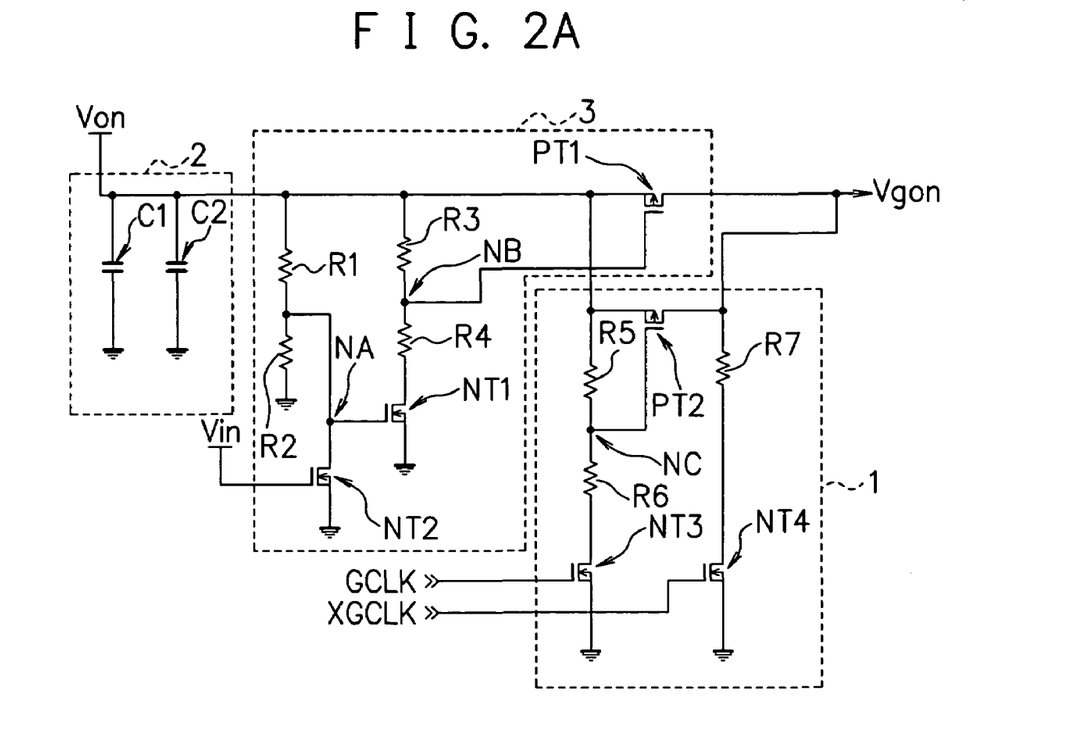
FIG. 2A and FIG. 2B are diagrams showing circuit configuration examples of the characteristic elements of the liquid crystal display device according to this embodiment.
Figure 2B:
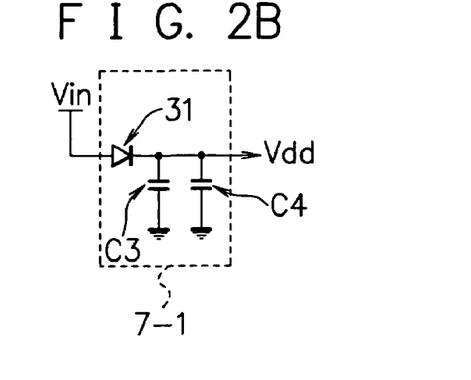

FIG. 2A and FIG. 2B are diagrams showing circuit configuration examples of the characteristic elements of the liquid crystal display device according to this embodiment.

FIG. 2A is a diagram showing a concrete circuit configuration of the luminance inclination circuit 1, the power holding circuit 2, and the power supply changeover circuit 3 shown in FIG. 1.

As shown in FIG. 2A, the power holding circuit 2 is constituted of two capacitors C1, C2 in which electrodes on one side thereof are connected to the gate-on power supply Von and the other electrodes are connected to the ground (grounded). Incidentally, FIG. 2A shows as an example the case where the power holding circuit 2 is constituted of the two capacitors, but it only needs to have a sufficient capacity, and the number of capacitors is arbitrary.

The power supply changeover circuit 3 is constituted of four resistances R1 to R4, two n-channel transistors (FETs: field effect transistors) NT1, NT2, and one p-channel transistor (FET) PT1. The resistances R1, R2 connected in series are connected in series between the aforesaid electrodes on one side of the capacitors C1, C2 and the ground. Here, resistance values of the resistances R1, R2 are determined appropriately so that the transistor NT1 can be turned on when the device power supply Vin is off (when the device power supply Vin is cut off).

A drain of the transistor NT2 is connected to a mutual connection point (a node NA) between the resistances R1 and R2, a source thereof is connected to the ground, and a gate thereof is fed with the device power supply Vin.

Further, the resistances R3, R4 connected in series are connected in series between the aforesaid electrodes on one side of the capacitors C1, C2 and a drain of the transistor NT1. A gate of the transistor NT1 is connected to the node NA and a source thereof is connected to the ground.

A source of the transistor PT1 is connected to the aforesaid electrodes on one side of the capacitors C1, C2, a drain thereof is connected to the gate-on power supply terminal Vgon of the gate driving circuit 4, and a gate thereof is connected to a mutual connection point (a node NB) between the resistances R3 and R4.

The luminance inclination circuit 1 is constituted of three resistances R5, R6, R7, two n-channel transistors (FETs) NT3, NT4, and one p-channel transistor (FET) PT2. Further, since a voltage fluctuation in synchronization with the outputs VOUTi of the gate driving circuit 4 is required, a gate clock signal GCLK for shifting the outputs VOUTi of the gate driving circuit 4 and a luminance inclination circuit control signal XGCLK that is inverted from the gate clock signal GCLK are inputted to the luminance inclination circuit 1. Incidentally, the gate clock signal GCLK and the luminance inclination circuit control signal XGCLK are generated in a later-described timing generating circuit.

The resistances R5, R6 connected in series are connected between the source of the transistor PT1 and a drain of the transistor NT3. A source of the transistor NT3 is connected to the ground and the gate clock signal GCLK is inputted to a gate thereof.

A source of the transistor PT2 is connected to the source of the transistor PT1, a drain thereof is connected to the gate-on power supply terminal Vgon, and a gate thereof is connected to a mutual connection point (a node NC) between the resistances R5 and R6. A drain of the transistor NT4 is connected to an end of the resistance R7 whose other end is connected to the gate-on power supply terminal Vgon, a source thereof is connected to the ground, and the luminance inclination circuit control signal XGCLK is inputted to a gate thereof.

With the above-described configuration, when the voltage value of the device power supply Vin is higher than the predetermined voltage value (high level), the potential of the node NA turns to low level (0(zero) V), so that the node NB turns to high level to turn off the transistor PT1. Consequently, the output voltage of the luminance inclination circuit 1 is supplied to the gate-on power supply terminal Vgon.

On the other hand, when the voltage value of the device power supply Vin is equal to or lower than the predetermined voltage value (low level), the potential of the node NA turns to high level, so that the node NB turns to low level to turn on the transistor PT1. Further, the gate clock signal GCLK and the luminance inclination circuit control signal XGCLK are shut off (suspended) in accordance with the decrease in the voltage value of the device power supply Vin. Consequently, the output voltage of the power holding circuit 2 is supplied to the gate-on power supply terminal Vgon.

FIG. 2B is a diagram showing a concrete circuit configuration of a power supply circuit 7-1 for supplying the logic power supply Vcc to the gate driving circuit 4. The power supply circuit 7-1 is provided in a later-described internal power supply generating circuit. The power supply circuit 7-1 is constituted of two capacitors C3, C4 and a diode 31.

An anode of the diode 31 is connected to the device power supply Vin and a cathode thereof is connected to the power supply terminal Vdd. The capacitors C3, C4 are connected in parallel between a mutual connection point of the cathode of the diode 31 and the power supply terminal Vdd and the ground. Incidentally, the case where the power supply circuit 7-1 is constituted of the two capacitors is shown as an example, but the number of capacitors is arbitrary. Further, noise filtering capacitors that are generally disposed in large number in power supply lines may be used as the capacitors C3, C4 to supply a power by residual charges thereof, and this will suffice for driving.

Figure 3:
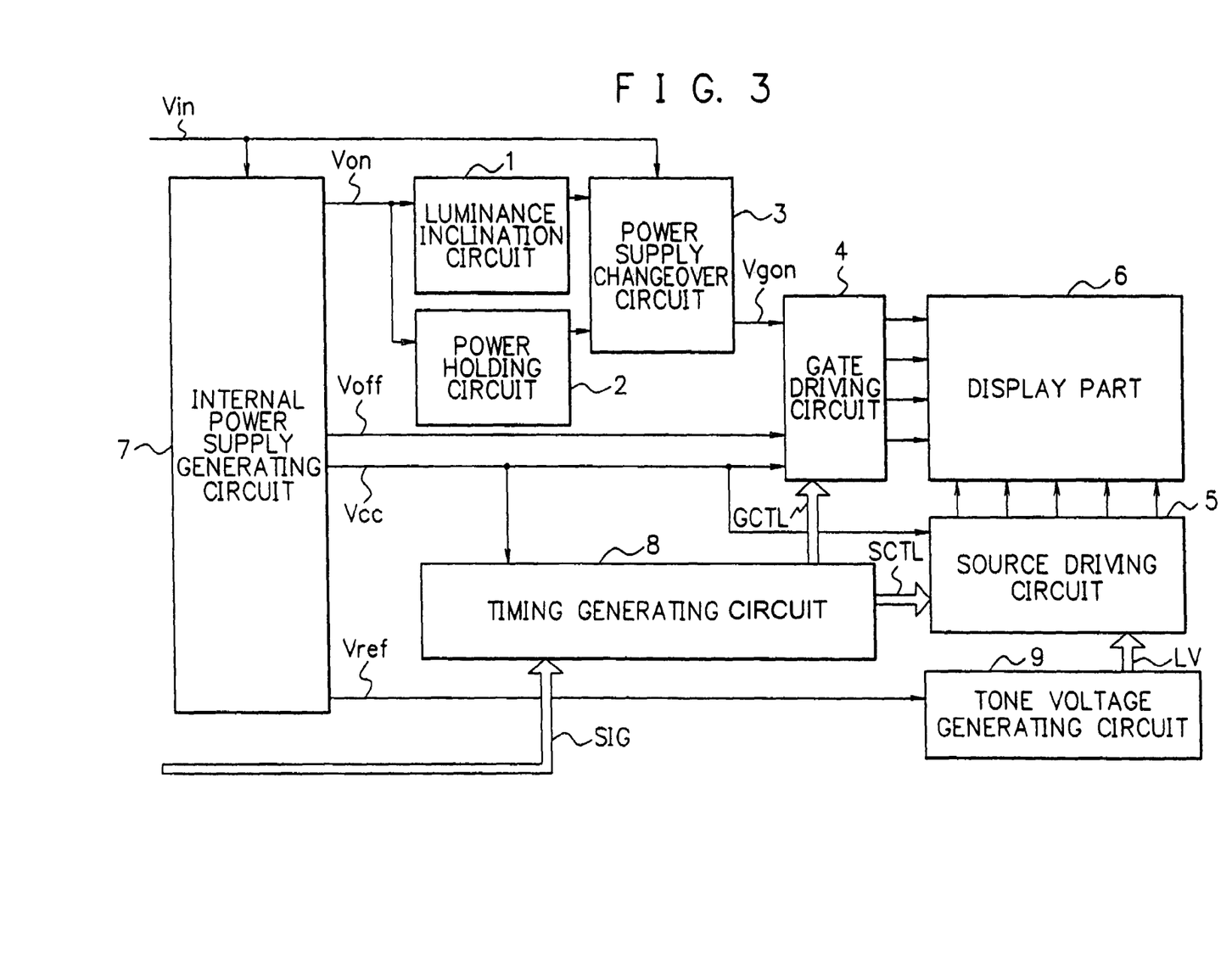
FIG. 3 is a block diagram showing a configuration example of the liquid crystal display device of this embodiment.

FIG. 3 is a block diagram showing a configuration example of the liquid crystal display device according to this embodiment. Note that, in FIG. 3, the same reference numerals and symbols are used to designate blocks and so on having the same functions as those of the blocks and so on shown in FIG. 1, and repeated explanation will be omitted.

In FIG. 3, a source driving circuit 5 supplies a voltage according to the tone level to a plurality of source lines provided in a display part 6. Specifically, based on a control signal SCTL such as a tone signal (display data signal) inputted from a timing generating circuit 8, the source driving circuit 5 selects a voltage according to the tone signal from voltages LV at respective tone levels generated in a tone voltage generating circuit 9, and outputs all outputs thereof in synchronization with the outputs VOUTi of the gate driving circuit 4. This makes it possible to supply (write) the tone voltages to the respective pixels associated with the gate lines via the thin film transistors connected to the gate lines selected in the display part 6.

In the display part 6, a plurality of gate lines and a plurality of source lines are arranged in matrix, and pixels for displaying an image are arranged at intersections of the gate lines and the source lines. Each of the pixels includes a thin film transistor whose gate and source are connected to the gate line and the source line.

The internal power supply generating circuit 7 includes the power supply circuit 7-1 shown in FIG. 2B, and it generates, from the device power supply Vin, power supplies at voltages (for example, 24 V, −5.5 V, and so on) used in the respective circuits. The power supplies generated in the internal power supply generating circuit 7 include the gate-on power supply Von, the gate-off power supply Voff, the logic power supply Vcc, a reference power supply Vref for generating a voltage according to the tone level, and so on.

Based on an image input signal SIG inputted from an external part, the timing generating circuit 8 generates a control signal GCTL (for example, the gate start pulse, the gate shift clock signal, the luminance inclination circuit control signal, and so on) for the gate driving circuit 4 and the control signal SCTL (the clock signal and so on) for the source driving circuit 5. Further, the timing generating circuit 8 outputs the generated control signal GCTL to the gate driving circuit 4 and synchronously outputs the generated control signal SCTL and tone signals of respective RGB colors to the source driving circuit 5.

Using the fed reference power supply Vref, the tone voltage generating circuit 9 generates the voltages at the respective tone levels that are to be supplied to liquid crystal via the thin film transistors arranged in the display part 6.

Figure 4:
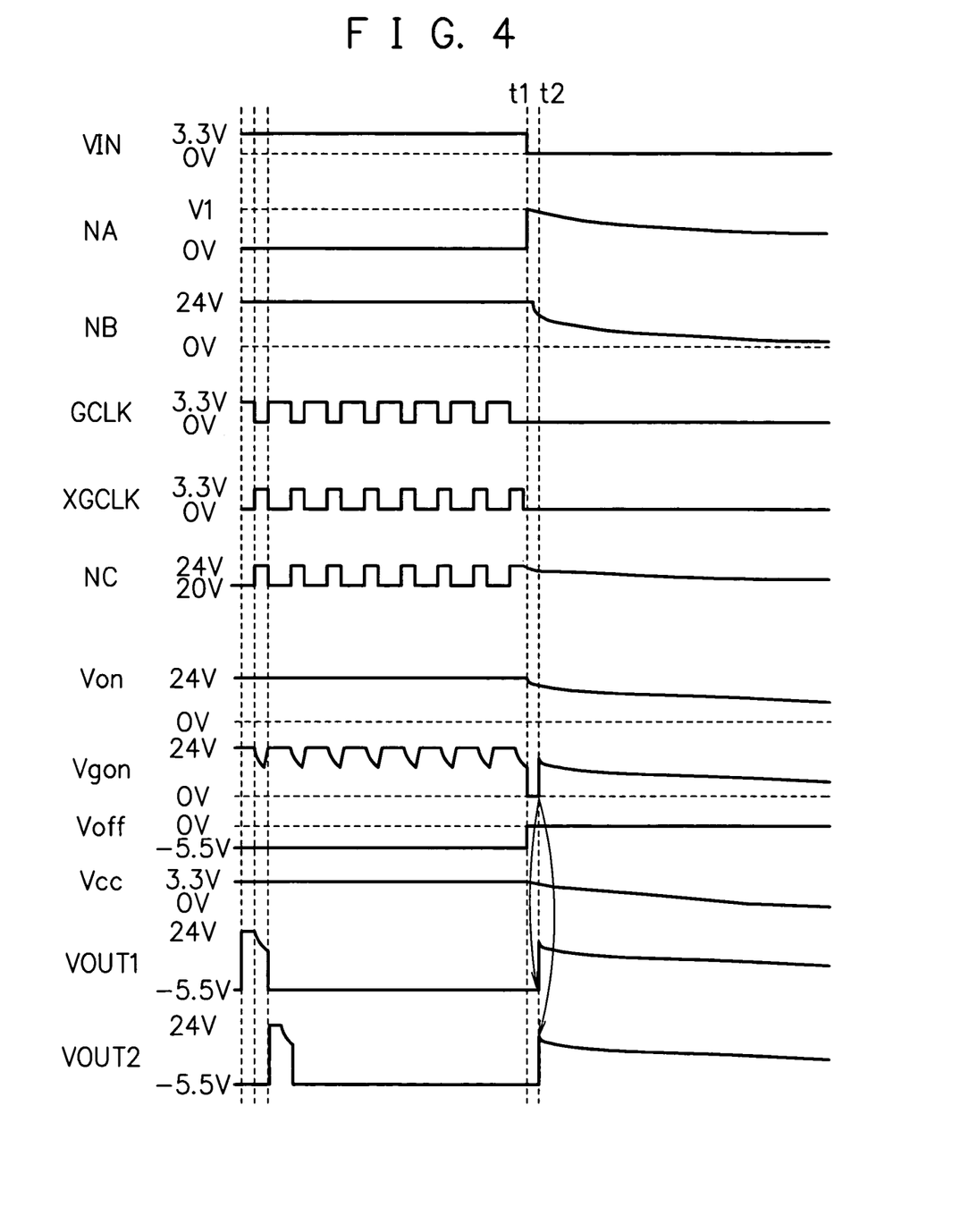
FIG. 4 is a timing chart showing examples of operational waveforms of the liquid crystal display device according to this embodiment.

Next, the operation of the liquid crystal display device according to this embodiment will be explained in detail based on FIG. 4. FIG. 4 is a timing chart showing examples of operational waveforms of the liquid crystal display device according to this embodiment. Note that only the driving of the gate lines will be explained below, referring to FIG. 2 when necessary, but the driving of the source lines is the same as that of the conventional liquid crystal display device.

First, at a normal driving time during which the device power supply Vin is normally fed to the liquid crystal display device (when the device power supply Vin is 3.3 V), the transistor NT2 whose gate is fed with the device power supply Vin is on (in a continuity state). Accordingly, the potential of the node NA turns to 0(zero) V and the transistor NT1 turns to an off state (non-continuity state). In accordance therewith, the potential of the node NB becomes equal to the potential of the gate-on power supply Von, and the transistor PT1 whose gate is connected to the node NB turns off since the potentials supplied to the source and gate thereof become equal to each other.

Further, in the luminance inclination circuit 1, to which the gate clock signal GCLK and the luminance inclination circuit control signal XGCLK are inputted as described above, the transistor NT3 turns on when the gate clock signal GCLK is 3.3 V. Accordingly, the potential of the node NC becomes about 20 V and the transistor PT1 turns on, so that the gate-on power supply Von is outputted to the gate-on power supply terminal Vgon of the gate driving circuit 4. At this time, since the luminance inclination circuit control signal XGCLK is 0(zero) V, the transistor NT4 is off, so that no influence is given to the output of the transistor PT2.

Next, when the gate clock signal GCLK is 0(zero) V, the transistor NT3 turns off. Accordingly, the potential of the node NC becomes equal to that of the gate-on power supply Von, and the potentials of the gate and source of the transistor PT2 become equal to each other, so that the transistor PT2 turns off. At this time, since the luminance inclination circuit control signal XGCLK is 3.3 V, the transistor NT4 turns on, and the potential of the gate-on power supply terminal Vgon is lowered toward 0(zero) V side.

Thus, at the normal driving time, the output voltage of the luminance inclination circuit 1, the respective power supply voltages such as the gate-off power supply Voff, and the control signal GCTL are inputted to the gate driving circuit 4, so that the outputs VOUT1, VOUT2, . . . , VOUTn of the gate driving circuit 4 as shown in FIG. 4 are sequentially outputted every one gate line period. The voltage supplied to the gate-on power supply terminal Vgon is changed in synchronization with falling edges of the gate clock signal GCLK, so that each of the outputs VOUTi of the gate driving circuit 4 also has a driving waveform whose falling edges are intentionally blunted. Therefore, luminance unevenness in the direction in which the gate lines extend in the display part 6 can be reduced, which makes it possible to obtain a good quality display image.

At the power-off time when the device power supply Vin fed to the liquid crystal display device is cut off (at a time t1 at which the device power supply Vin turns to 0(zero) V), the transistor NT2 turns off. Accordingly, the potential of the node NA becomes V1 (V1 is a potential that can turn on the transistor NT1), so that the transistor NT1 turns on. The potential of the node NB accordingly lowers, so that the transistor PT1 turns on because a difference in potential occurs between the source and gate thereof. Consequently, the voltage held in the power holding circuit 2 is outputted to the gate-on power supply terminal Vgon at a time t2 after the power-off time.

At this time, the luminance inclination circuit 1 becomes 0(zero) V since the supply of the gate clock signal GCLK and the luminance inclination circuit control signal XGCLK is stopped due to the cutoff of the device power supply Vin. Accordingly, the transistors NT3, NT4 both turn off, so that the transistor PT1 turns off since the potentials supplied to the source and gate thereof become equal to each other.

Thus, at the power-off time, it is possible to quickly change the power supply, which is fed to the gate-on power supply terminal Von, from the output of the luminance inclination circuit 1 to the output of the voltage holding circuit 2 immediately after the device power supply Vin is cut off. Further, the gate driving circuit 4 at the power-off time asynchronously outputs the outputs of the power holding circuit 1, which are inputted to the gate-on power supply terminal Vgon, to all the outputs VOUTi as shown in FIG. 4 since the device power supply Vin fed to the all-output-on terminal Vxon becomes 0(zero) V.

Consequently, all the thin film transistors in the display part 6 turn on to enable quick discharge of the residual charges in the liquid crystal. This makes it possible to clear the display, so that the afterimage can be prevented from being visible at the power-off time.

Incidentally, in the above-described embodiment, the device power supply Vin is directly inputted to the all-output-on terminal Vxon of the gate driving circuit 4, but it is also acceptable to provide a circuit that forcibly turns the voltage in the all-output-on terminal Vxon to low level when the device power supply Vin lowers to a predetermined voltage level. With such a structure, for example, even when a power supply device that does not have a capability of lowering the device power supply Vin in a short time is used, the potential of the all-output-on terminal Vxon can be forcibly lowered, so that the residual charges in the liquid crystal can be surely discharged to clear the display before the power held in the power holding circuit 2 is completely discharged.

As has been explained hitherto, according to the present invention, when the input power supply fed to the liquid crystal display device is cut off, the gate-on power supply for driving the gate lines of the display part is automatically changed from the first power supply, whose voltage is changed with time to reduce luminance inclination unevenness in the display part, to the second power supply whose voltage is kept constant for a predetermined period of time to discharge residual charges in the liquid crystal. Consequently, at the normal driving time, a good quality display image with reduced unevenness in luminance inclination can be obtained, and at the power-off time, the display due to the residual charges in the liquid crystal is cleared, so that an afterimage can be prevented from being visible. This can realize improved display quality of the liquid crystal display device both at the normal driving time and at the power-off time.

The present embodiment is to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A liquid crystal display device, being configured such that at least one internal power supply, which is a power supply for driving gate lines of a display part in the liquid crystal display device, is automatically changed, using a power supply changeover circuit, from a first power supply, which includes a luminance inclination circuit, to a second power supply, which includes a power holding circuit, and which is different from the first power supply, when an input power supply fed to the liquid crystal display device is cut off, wherein said first power supply and said second power supply are connected in parallel and further wherein said power supply changeover circuit directly detects the cut off of the input power supply, wherein, after the input power supply is cut off, a voltage based on said second power supply is outputted to all gate signal lines of the display part.

2. The liquid crystal display device according to claim 1, wherein a voltage of said first power supply changes with time, and wherein a voltage of said second power supply is attenuated according to a power outputted as the internal power supply.

3. The liquid crystal display device according to claim 1, wherein a voltage of said first power supply lowers every constant period and thereafter, returns to an original voltage, and wherein a voltage of said second power supply is kept substantially constant.

4. The liquid crystal display device according to claim 1, wherein said power holding circuit is configured to hold a power fed by the input power supply, and wherein said second power supply uses the power held in said power holding circuit.

5. The liquid crystal display device according to claim 4, wherein as said second power supply, residual charges in said power holding circuit are utilized.

6. The liquid crystal display device according to claim 1, wherein said internal power supply is a gate-on power supply involved in driving control of the gate signal line of the display part.

7. The liquid crystal display device according to claim 1, wherein said liquid crystal display device is a reflective liquid crystal display device.

8. The liquid crystal display device according to claim 1, wherein said liquid crystal display device is a transflective liquid crystal display device.

9. The liquid crystal device according to claim 1, wherein said power supply changeover circuit includes a plurality of resistors and a plurality of transistors.

10. The liquid crystal device according to claim 9, wherein said plurality of transistors includes two n-channel transistors and one p-channel transistor.

11. The liquid crystal display device according to claim 1, wherein a waveform of an output driving voltage of said first power supply includes intentionally blunt falling edges.

12. A liquid crystal display device, comprising:
- a first power supply circuit configured to generate a first power supply from an input power supply fed to the liquid crystal display device, wherein said first power supply circuit includes a luminance inclination circuit;
- a second power supply circuit configured to generate from the input power supply a second power supply different from the first power supply, wherein said second power supply circuit and said first power supply circuit are connected in parallel and further wherein said second power supply circuit includes a power holding circuit; and
- a power supply changeover circuit configured to selectively output, as an internal power supply, one of the first power supply generated in said first power supply circuit and the second power supply generated in said second power supply circuit, wherein said internal supply is a power supply for driving gate lines of a display part in the liquid crystal display device, and further wherein said power supply changeover circuit directly detects a cut off of the input power supply.

13. The liquid crystal display device according to claim 12, wherein said power supply changeover circuit automatically changes the power supply to be outputted as the internal power supply from the first power supply to the second power supply when the input power supply is cut off.

14. The liquid crystal display device according to claim 12, wherein said power supply changeover circuit changes the power supply to be outputted as the internal power supply according to a voltage of the input power supply.

15. The liquid crystal display device according to claim 12, wherein the internal power supply is a power supply for driving the gate signal line of the display part.

16. The liquid crystal display device according to claim 15,
- wherein said first power supply circuit generates a voltage waveform for reducing luminance unevenness in a direction in which the gate signal line of the display part extends, and
- wherein said second power supply circuit generates a voltage waveform whose voltage is constant.

17. The liquid crystal display device according to claim 12,
- wherein said first power supply circuit generates the first power supply whose voltage is changed based on an inputted oscillation signal, and
- wherein said second power supply circuit holds a power by the input power supply to generate the second power supply.

18. The liquid crystal display device according to claim 12, further comprising:
- a gate driving circuit configured to be fed with the internal power supply to drive the gate signal line of the display part,
- wherein said gate driving circuit sequentially outputs signals generated using the first power supply to the gate signal lines, and when the input power supply is cut off, said gate driving circuit outputs a voltage of the second power supply to all the gate signal lines.

19. The liquid crystal device according to claim 2, wherein said power supply changeover circuit includes a plurality of resistors and a plurality of transistors.

20. The liquid crystal device according to claim 19, wherein said plurality of transistors includes two n-channel transistors and one p-channel transistor.

21. The liquid crystal display device according to claim 12, wherein a waveform of an output driving voltage of said first power supply includes intentionally blunt falling edges.

22. A liquid crystal display device comprising:
- a luminance inclination circuit configured to generate, from an input power supply fed to the liquid crystal display device, a voltage waveform for reducing luminance unevenness in a direction in which a gate signal line of a display part extends;
- a power holding circuit configured to hold a power by the input power supply, wherein said power holding circuit and said luminance inclination circuit are connected in parallel;
- a power supply changeover circuit configured to selectively output one of an output from said luminance inclination circuit and an output from said power holding circuit according to a voltage of the input power supply, wherein said power supply changeover circuit directly detects a cut off of the input power supply; and
- a gate driving circuit configured to be fed with an output of said power supply changeover circuit to drive the gate signal line of the display part.

23. The liquid crystal display device according to claim 22, wherein said power supply changeover circuit outputs an output from said luminance inclination circuit when a voltage value of the input power supply is higher than a threshold value, and outputs an output from said power holding circuit when the voltage value of the input power supply is equal to or lower than the threshold value.

24. The liquid crystal device according to claim 22, wherein said power supply changeover circuit includes a plurality of resistors and a plurality of transistors.

25. The liquid crystal device according to claim 24, wherein said plurality of transistors includes two n-channel transistors and one p-channel transistor.

26. The liquid crystal display device according to claim 22, wherein a waveform of an output driving voltage of said first power supply includes intentionally blunt falling edges.

* * * * *

UNITED STATES PATENT AND TRADEMARK OFFICE
CERTIFICATE OF CORRECTION

PATENT NO. : 7,408,541 B2
APPLICATION NO. : 10/808071
DATED : August 5, 2008
INVENTOR(S) : Syouichi Fukutoku It is certified that error appears in the above-identified patent and that said Letters Patent is hereby corrected as shown below:

Col. 10, line 9, delete "claim 2" and insert --claim 12--.

Signed and Sealed this

Twenty-fourth Day of February, 2009

JOHN DOLL
*Acting Director of the United States Patent and Trademark Office*